United States Patent [19]

Watari et al.

[11] Patent Number: 4,950,024
[45] Date of Patent: Aug. 21, 1990

[54] VEHICLE COWL STRUCTURE HAVING ALTERNATING INTERIOR AND EXTERIOR REINFORCMENTS

[75] Inventors: Tadayoshi Watari; Masahiro Osumi, both of Hiroshima, Japan

[73] Assignee: Mazda Motor Corporation, Hiroshima, Japan

[21] Appl. No.: 424,830

[22] Filed: Oct. 20, 1989

[30] Foreign Application Priority Data

Oct. 21, 1988 [JP] Japan ................ 63-266931

[51] Int. Cl.⁵ ............................................. B60K 37/00
[52] U.S. Cl. .................................... 296/192; 296/201
[58] Field of Search .................. 296/192, 194, 201, 30

[56] References Cited

U.S. PATENT DOCUMENTS

| | | | |
|---|---|---|---|
| 4,699,419 | 10/1987 | Kawase et al. | 296/192 |
| 4,750,780 | 6/1988 | Harasaki et al. | 296/192 |
| 4,789,198 | 12/1988 | Ide | 296/192 |

FOREIGN PATENT DOCUMENTS

| | | | |
|---|---|---|---|
| 63970 | 5/1980 | Japan | 296/194 |
| 11174 | 1/1982 | Japan | 296/192 |
| 26055 | 2/1982 | Japan | 296/192 |
| 11976 | 1/1984 | Japan | 296/194 |
| 37583 | 2/1986 | Japan | 296/194 |
| 249876 | 11/1986 | Japan | 296/192 |
| 282170 | 12/1986 | Japan | 296/194 |
| 6872 | 1/1987 | Japan | 296/192 |
| 39371 | 2/1987 | Japan | 296/192 |
| 134372 | 6/1987 | Japan | 296/192 |
| 265776 | 11/1988 | Japan | 296/192 |

*Primary Examiner*—Magaret A. Focarino
*Assistant Examiner*—Gary C. Hoge
*Attorney, Agent, or Firm*—Sixbey, Friedman, Leedom & Ferguson

[57] ABSTRACT

A cowl box extends in the transverse direction of a vehicle body in front of the passenger room between left and right hinge pillars and is defined by a windshield support member on which the windshield of the vehicle is supported and a dashboard upper member which is joined to the lower surface of the windshield support member. The dashboard upper member has a vertical wall portion facing the passenger room. The cowl box having an open cross-section. A reinforcement is provided along the joining line of the dashboard upper member to the windshield support member. The reinforcement is formed of end portions which extend along respective end portions of the joining line of the dashboard upper member to the windshield support member and a main portion which extends along the rest of the joining line of the dashboard upper member to the windshield support member. The end portions are on the passenger room side over the entire length thereof and are fixed to the corresponding hinge pillars. The main portion is on the side remote from the passenger room.

4 Claims, 3 Drawing Sheets

VEHICLE COWL STRUCTURE HAVING ALTERNATING INTERIOR AND EXTERIOR REINFORCMENTS

BACKGROUND OF THE INVENTION

1. Field of the Invention

This invention relates to a front structure for a vehicle.

2. Description of the Prior Art

Generally, the lower end of the windshield of a vehicle is supported on the upper face of a cowl box which extends in the transverse direction of the vehicle on the front side of the passenger room. There have been known a closed cowl box and an open cowl box. The open cowl box is defined by a windshield support member and a dashboard upper member and has an open cross-section. A reinforcement is provided along the joining line of the windshield support member and the dashboard upper member so that a closed cross-section extending in the transverse direction of the vehicle body is defined by the three members. Due to its open cross-section, the open cowl box is easily collapsed upon a head-on collision and protects the passenger.

Conventionally, the reinforcement has been mounted on the vertical wall portion of the dashboard upper member facing the passenger room so that the closed cross-section projects toward the passenger room and extends over the entire width of the vehicle body. However, this arrangement is disadvantageous in view of the layout of the members of the air conditioner. For example, the defroster duct, the air duct and the like are generally disposed on the passenger room side of the dashboard upper member at the middle as viewed in the transverse direction of the vehicle body.

SUMMARY OF THE INVENTION

In view of the foregoing observations and description, the primary object of the present invention is to provide a front structure for a vehicle which can afford sufficient room for mounting the air conditioner members on the passenger room side of the cowl box without reduction of the stiffness of the structure for supporting the windshield.

In accordance with the present invention, there is provided a front structure for a vehicle comprising a cowl box which extends in the transverse direction of the vehicle body in front of a passenger room between left and right hinge pillars and is defined by a windshield support member on which the windshield of the vehicle is supported and a dashboard upper member which is joined to the lower surface of the windshield support member and has a vertical wall portion facing the passenger room, the cowl box having an open cross-section, and a reinforcement being provided along the joining line of the dashboard upper member to the windshield support member, characterized in that said reinforcement comprises an end portion which extends along an end portion of the joining line of the dashboard upper member to the windshield support member and a main portion which extends along the rest of the joining line of the dashboard upper member to the windshield support member, the end portion being on the passenger room side over the entire length thereof and being fixed to one of said hinge pillars, and the main portion being on the side remote from the passenger room at least at a portion opposed to an intermediate portion of the cowl box.

With arrangement, the closed cross-section defined by the windshield support member, the dashboard upper member and the reinforcement extends substantially over the entire width of the cowl box though it is on the passenger room side at an end portion thereof and on the other side at an intermediate portion thereof. Accordingly, the stiffness of the structure for supporting the windshield is not weakened. Further since the reinforcement is on the side remote from the passenger room at an intermediate portion of the cowl box, mounting of the air conditioner members is facilitated.

DESCRIPTION OF THE PREFERRED EMBODIMENT

Figure 1:
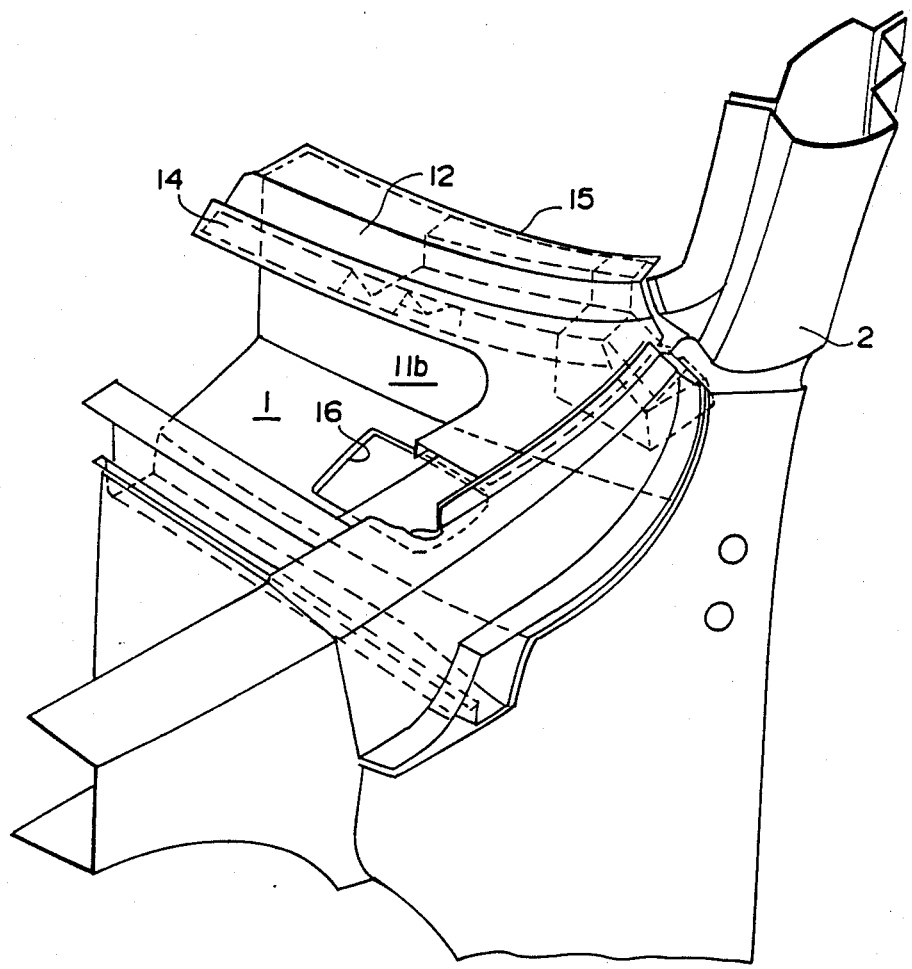
FIG. 1 is a fragmentary perspective view showing a vehicle body provided with a front structure in accordance with an embodiment of the present invention.
Figure 2:
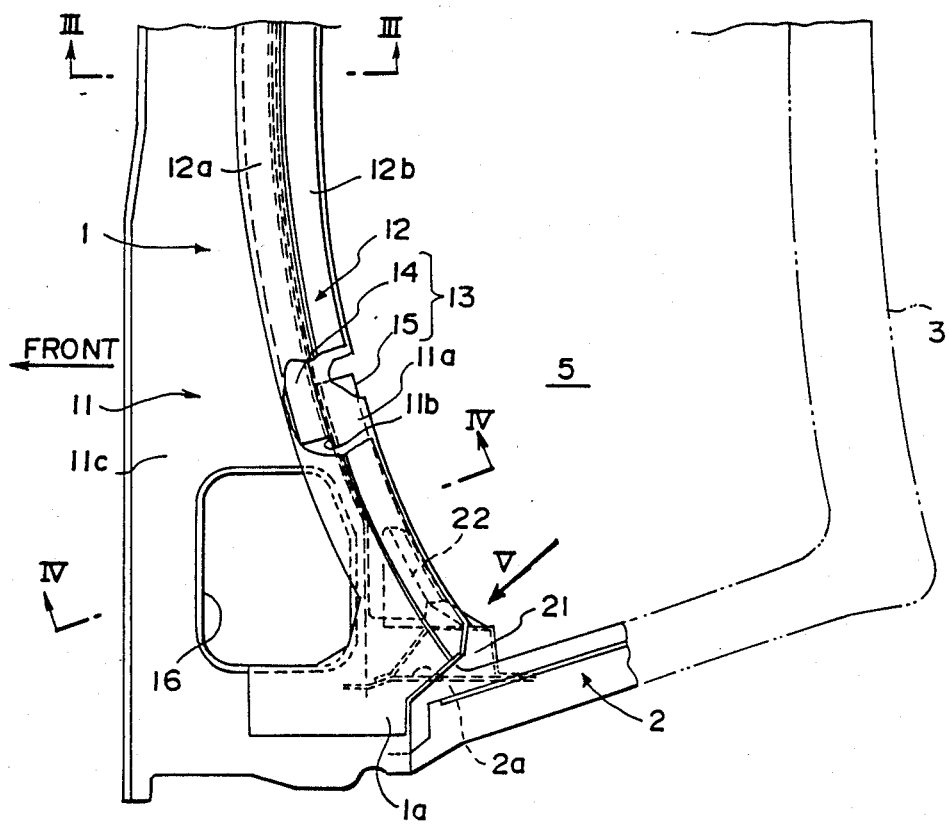
FIG. 2 is a plan view of the vehicle body.
Figure 3:
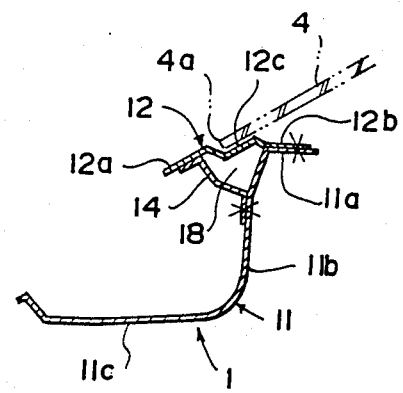
FIG. 3 is a cross-sectional view taken along line III—III in FIG. 2.
Figure 4:
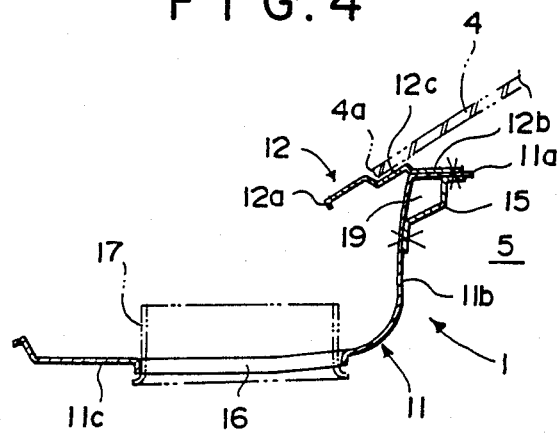
FIG. 4 is a cross-sectional view taken along line IV in FIG. 2.
Figure 5:
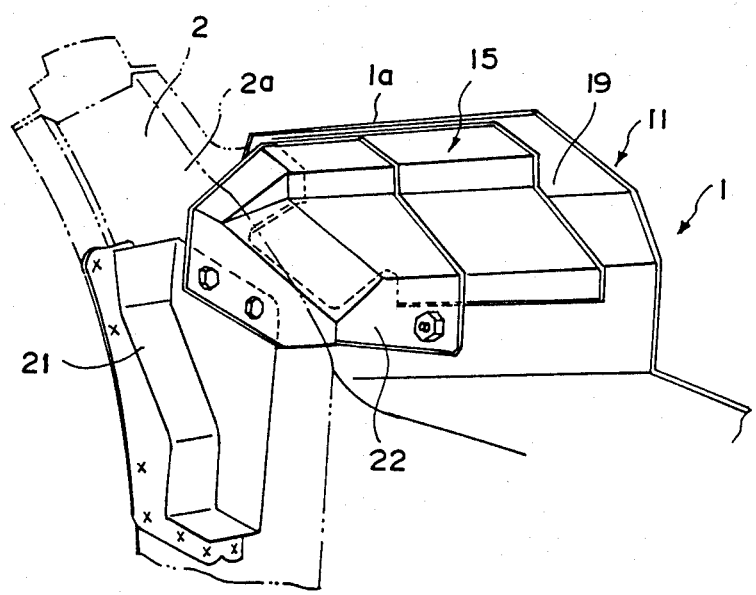
FIG. 5 is an enlarged view of the part indicated at V in FIG. 2.

FIGS. 1 and 2 show the left side portion of a cowl box 1. Though the right side portion of the cowl box 1 is not shown, it is arranged in the same manner as the left side portion illustrated in this particular embodiment. Left and right front pillars 2 (only the left front pillar is shown) are disposed on the left and right sides of the vehicle body and incline rearwardly. A front header 3 connects the upper ends of the front pillars 2, and a windshield 4 (FIGS. 3 and 5) is mounted in a rectangular frame defined by the front pillars 2 and the front header 3.

The cowl box 1 is of an open type as clearly shown in FIGS. 1 to 4, and is defined by a dashboard upper member 11, a windshield support member 12 and a reinforcement 13.

The dashboard upper member 11 comprises a flange portion 11a which extends substantially horizontally, a vertical wall portion 11b which extends downward from the front edge of the flange portion 11a, and and a bottom wall portion 11c which extends forward from the lower edge of the vertical wall portion 11b. The vertical wall portion 11b is arched at the intermediate portion and is concave as viewed from the passenger room 5 as clearly shown in FIG. 2. The bottom wall portion 11c of the dashboard upper member 11 is longer (the size as measured in the longitudinal direction of the vehicle body) at left and right side portions than at the intermediate portion of the cowl box 1. Openings 16 for mounting air ducts 17 (FIG. 4) are formed in the left and right side portions of the bottom portion 11c of the dashboard upper member 11.

The windshield support member 12 is curved so as to conform to the shape of the vertical wall portion 11b of the dashboard upper member 11, and is substantially equal to the dashboard upper member 11 in width. The windshield support member has a front edge portion 12a and a rear edge portion 12b. The rear edge portion 12b is welded to the flange portion 11a of the dashboard upper member 11 with the front edge portion 12a projecting forward and, the windshield support member 12 is thereby integrally connected to the dashboard upper member 11. The windshield support member 12 is further provided with a shoulder 12c which extends in the transverse direction of the vehicle body between the front and rear edge portions 12a and 12b. The lower edge 4a of the windshield 4 is supported on the shoulder 12c.

The reinforcement 13 comprises a main portion 14 and a pair of end portions 15 (though only one of which is shown in the drawings). The main portion 14 is connected between the intermediate portion of the vertical wall portion 11b of the dashboard upper member 11 and the intermediate portion of the front edge portion 12a of the windshield support member 12 on the side of the vertical wall portion 11b remote from the passenger room 5, and defines a closed cross-section 18 together with the vertical wall portion 11b and the front edge portion 12a. Each end portion 15 is connected between the end portion of the vertical wall portion 11b of the dashboard upper member 11 and the end portion of the rear edge portion 12b of the windshield support member 12 on the side of the vertical wall portion 11b facing the passenger room 5, and defines a closed cross-section 19 together with the vertical wall portion 11b and the rear edge portion 12b. The main portion 14 and each of the end portions 15 of the reinforcement 13 overlap each other at the end of the main portion 15 over a suitable length. Thus the reinforcement 13 forms a closed cross-section which is substantially continuous between opposite sides of the vehicle body. Accordingly, the bending stiffness of the cowl box 1 of this embodiment is substantially equivalent to that of a conventional cowl box in which the reinforcement is continuous on the side of the cowl box facing the passenger room.

Further, since the reinforcement 13 is on the side of the cowl box 1 remote from the passenger room 5 at the intermediate portion of the cowl box 1 in this embodiment, a space larger than that in the conventional cowl box can be shared to the air conditioner members.

Further since the reinforcement 13 is on the side of the cowl box 1 facing the passenger room 5 at portion near the sides of the vehicle body, the openings 16 formed on the inner side of the cowl box 1 can be large in size, which is preferable in view of improvement in the air-conditioning performance.

The cowl box 1 in this embodiment is fixed to the front pillars 2 at opposite ends 1a thereof and forms a part of the vehicle body together with the front pillars 2. Conventionally, it has been difficult to directly connect the end of the cowl box to the front pillar, and accordingly, the end of the cowl box has been fixed to a cowl side panel which extends forward from the front pillar. The conventional joining arrangement is disadvantageous in that since the closed cross-sections are not directly connected, the joining stiffness is not sufficient and cannot satisfactorily withstand the torsional force or the bending force acting the joint of the cowl box and the front pillar. In this embodiment, a first bracket 21 which is like a box in shape is fixed to the inner panel 2f of the front pillar 2 and a second bracket 22 which is also like a box in shape is fixed to the outer end of each end portion 15 of the reinforcement 13, and the first and second brackets 21 and 22 having a high stiffness are connected together by bolts. With this arrangement, the closed cross-section of the cowl box 1 and the closed cross-section of the front pillar 2 is directly connected, whereby the stiffness of the joint of the cowl box 1 and the front pillar 2 is increased.

What is claimed is:

1. A front structure for a vehicle comprising a cowl box which extends in the transverse direction of a vehicle body in front of a passenger room between left and right hinge pillars and is defined by a windshield support member on which a windshield of the vehicle is supported and a dashboard upper member which is joined to a lower surface of the windshield support member and has a vertical wall portion facing the passenger room, the cowl box having an open cross-section, and a reinforcement being provided along a joining line of the dashboard upper member to the windshield support member, characterized in that said reinforcement comprises an end portion which extends along an end region of the joining line of the dashboard upper member to the windshield support member and a main portion which extends along of the joining line of the dashboard upper member to the windshield support member inbeard of said end portion, the end portion being on the passenger room side of said joining line over the entire length said end portion thereof and being fixed to one of said hinge pillars, and the main portion being on a side of said joining line remote from the passenger room at least at a portion opposed to an intermediate portion of the cowl box.

2. A front structure for a vehicle as defined in claim 1 in which said reinforcement further comprises a second end portion which extends along another end region of the joining line and fixed to the other hinge pillar.

3. A front structure for a vehicle as defined in claim 2 in which said main portion of the reinforcement overlaps a inner end of each of the end portions.

4. A front structure for a vehicle as defined in claim 2 in which an outer end of each of the end portions of the reinforcement is connected to the hinge pillar by way of box like brackets which are respectively fixed to the outer end of the end portion and the hinge pillar and fixed together by bolts.

* * * * *